April 18, 1961  L. J. PIRCON  2,979,951
TEMPERATURE SENSING APPARATUS
Filed Dec. 30, 1958
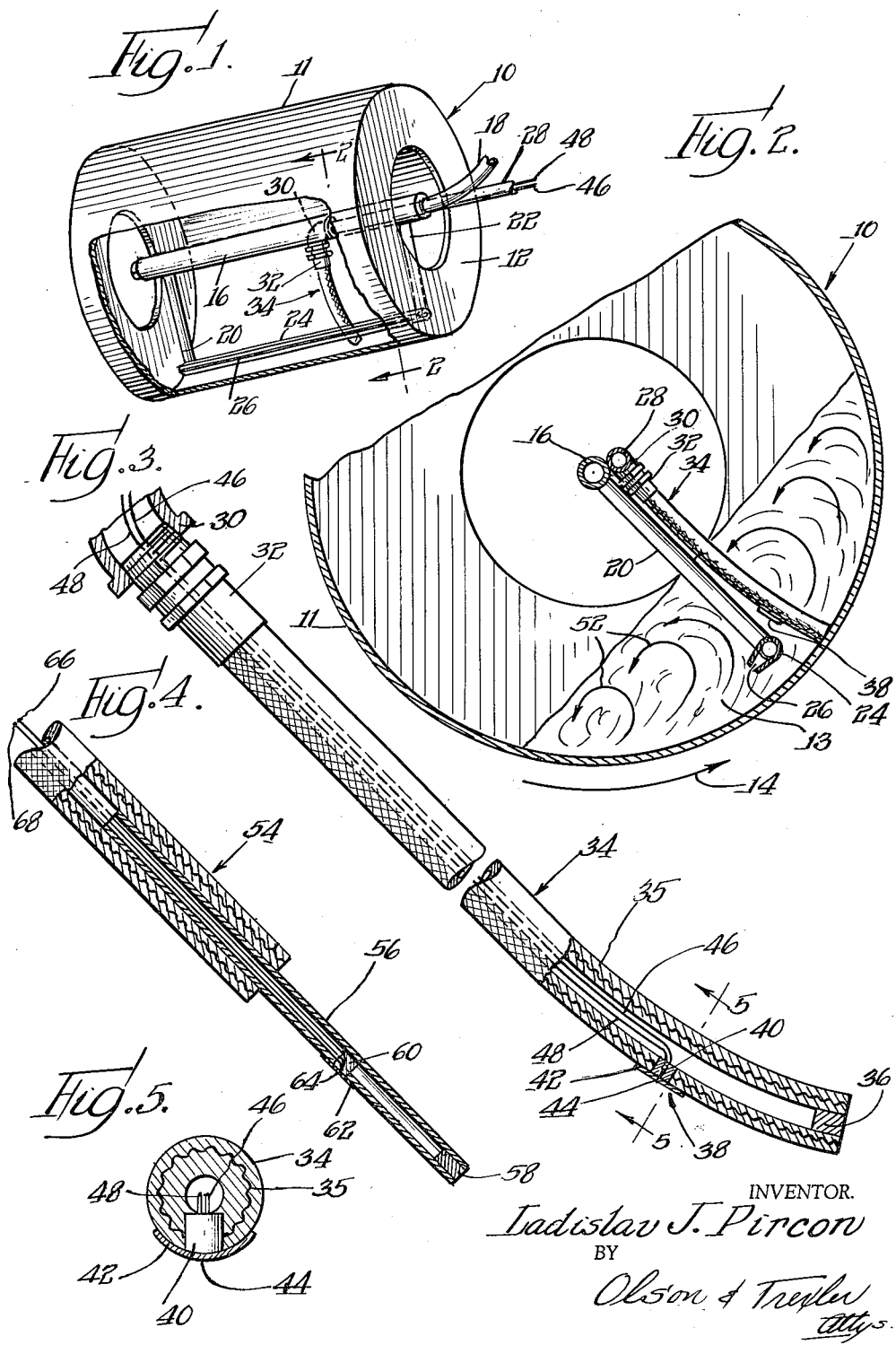
INVENTOR.
Ladislav J. Pircon
BY
Olson & Trexler
Attys.

United States Patent Office

2,979,951
Patented Apr. 18, 1961

2,979,951

TEMPERATURE SENSING APPARATUS

Ladislav J. Pircon, Stickney, Ill., assignor to Central Farmers Fertilizer Company, Chicago, Ill., a corporation of Illinois Filed Dec. 30, 1958, Ser. No. 783,856

10 Claims. (Cl. 73—351)

This invention relates to a temperature sensing apparatus and more particularly to a temperature sensing apparatus for use in a rotating mixing drum, rotary cylindrical ammoniator, or the like.

It is frequently desirable to be able to measure temperatures within a rotating mixer or ammoniator. Temperature measurements can be used to obtain much information including valuable information on the progress and uniformity of reactions taking place. They can be useful in recording the operation of an ammoniator, to provide close control over reactions, to provide research data for improving processes, or to provide information on which the development of new processes may be based.

In order to measure temperatures within the material being mixed, devices have been employed which extend into the mixture to position a thermocouple therein. Heretofore, rigid thermocouple wells have been provided for this purpose. However, material often tends to collect on the surface of these wells and insulate the thermocouple junctions from the fluid mixture. To maintain accurate temperature measurements, the thermocouple wells must therefore be frequently cleaned. If the material builds up long enough before cleaning, increased resistance to flow may even cause a well to break off.

No satisfactory means has heretofore been provided for measuring temperatures within ammoniators, mixers, or reactors wherein this material build-up occurs.

It is an object of this invention to provide a temperature sensing apparatus that will accurately measure temperatures within such an ammoniator, mixer, or reactor for a relatively long period of time without requiring cleaning or other special attention.

It is another object of this invention to provide a flexible mounting for a temperature sensitive device that will wear well and free itself of accumulated incrustation.

It is still another object of this invention to provide a temperature sensing assembly for use in a rotating mixer that will sense temperatures in a fluid slurry at a known depth and position within the mixer.

It is a further object of this invention to provide a device for sensing temperature differences with a reacting batch at given positions relative to a sparger.

It is a still further object of this invention to provide a reactor of the tumbling ammoniator variety with a thermocouple or the like mounted on a flexible tube that will resist build up of incrustation.

Other and further objects and features of this invention will become apparent from the following description and the appended claims as illustrated by the accompanying drawings which show, by way of an example, a temperature sensing apparatus according to the present invention and in which:

Fig. 1 is a partially cut away perspective view of a reactor and a temperature sensing assembly.

Fig. 2 is an enlarged partial cross sectional view taken substantially along lines 2—2 in Fig. 1.

Fig. 3 is a still further enlarged partial sectional view of the hose portion shown in Fig. 2.

Fig. 4 is a partial sectional view of an optional hose portion for use in place of the hose of Fig. 3.

Fig. 5 is a cross sectional view of the hose in Fig. 3 taken along line 5—5 in Fig. 3.

Referring now more specifically to the drawings wherein like parts are designated by the same numerals throughout the various figures, a rotating mixing drum 10 is shown in Figs. 1 and 2. The rotating mixing drum 10 comprises a cylindrical body portion 11 and a pair of circular or ring-like end portions or flanges 12. The end portions 12 are centrally apertured for access to the inside of the drum. The drum 10 is partially filled with a semi-fluid mixture 13 and is rotatable in a counterclockwise direction as viewed in Fig. 2. (See number 14.)

Feeder tube means 16 extend coaxially throughout the length of the drum, and inlet tube means 18 are provided to carry reacting chemicals to feeder tube means 16 from tank means or other suitable source. In an ammoniator, at least two sets of tube means are required, one for acidic material and another for basic material. Solids and semi-solids are added to the drum through the apertures in the end portions 12 manually or by suitable conveyor means or the like.

Parallel radial feeder tube means 20 and 22 extend downward from the axial feeder tube means 16 at an angle of approximately 45° to the horizontal. At the radially outward end of the radial feeder tube means 20 and 22, distributor bar means 24 are supported longitudinally within the drum. Chemicals pass through the feeder tube means into the distributor bar means 24 and are added to the mixture 13 in the drum through slit-like aperture means 26 or other suitable aperture means such as perforations in the lower side of the distributor bar means 24. The aperture means extend substantially throughout the length of the drum 10. The chemicals are sprayed through the aperture means into the mixture downwardly at an angle of approximately 45° to the horizontal.

Further axial tube means 28 extend into the drum 10 adjacent to the axial feeder tube means 16. These further axial tube means 28 are mounted so as to be longitudinally movable relative to the drum 10. At the inner end of the further axial tube means 28, elbow means 30 or other suitable right angle joint means connect the tube means 28 to hose fitting means 32 which are, in turn, connected to a radially extending flexible tube 34.

The flexible tube 34 is best shown in Fig. 3 and is preferably composed of a plastic of the polytetrafluoroethylene resin type. However, the flexible tube may be fabricated from any of a variety of materials including chlorinated silicone rubbers, temperature resistant synthetic rubbers, and numerous flexible plastics. The walls of the flexible tube 34 are reinforced by tubular wire mesh 35 embedded therein. The radial outward end of the tube 34 is sealed and weighted by suitable plug means 36. The plug means 36 may be of lead or other dense material.

Near the radially outward end of the tube and mounted in its lower side is a thermocouple junction 38. The thermocouple is embedded in a lead plug 40 or other protective plug which extends through the wall of the flexible tube 34. Overlying the lead plug and the adjacent surface portions of the flexible tube is a steel cover plate 42. The thermocouple wires protrude a short distance through the cover plate 42 into exposure with the surrounding mixture at 44.

Alternatively, the cover plate 42 may be omitted and the thermocouple wires embedded in the plug 40 in such manner as to expose the junction 44 and a short segment of wire on each side thereof to the mixture 13.

Connecting wires 46 and 48 lead from the thermocouple junction axially through the flexible tube 34 and the further axial tube means 28 to appropriate electric meter means (not shown) for translation of the electrical thermocouple potential into temperature readings. The angle of the flexible hose with horizontal is fixed so that the thermocouple junction 38 is always above the distributor bar means 24 and adjacent to its back side (see Fig. 2). This position could be changed without deviating from the principles of the present invention but it is frequently important to know the position within the cylinder at wihch the temperature readings are being taken. The flexible tube 34 is made long enough that its radially outward end and plug 36 will ride against the inside cylinder wall during mixing.

The mixture 13 in the drum 10 typically may be a granular or particulate solid with a reacting liquid added thereto. It partially fills the drum and is of semi-fluid consistency. As the drum rotates in a counterclockwise direction (as seen in Fig. 2) the mass of material 13 tends to be carried with it. However, the material tumbles downwardly as it reaches various heights causing a counterclockwise mixing action within the fluid as shown by arrows 52 in Fig. 2.

Many mixtures tend to stick to the thermocouple and its mountings in reactors of this type. However, to function properly, the thermocouple junction must be free, and not insulated from the fluid material within the drum by incrustations.

The polytetrafluoroethylene surface of the flexible tube 34 adheres very poorly to most substances. Initial formation of incrustation is thereby greatly reduced by the use of this tube material. If incrustation does begin, the movements of the drum and of the viscous material will vibrate and flex the flexible tube 34 whereby the crack off the incrusted material.

By exposing the thermocouple junction 38 through the side of the flexible tube 34 instead of at its end, the place of greatest incrustation is avoided. Thermocouple wells are known to crust up most severely at their ends when used for the purposes herein described.

The junction 38 is situated behind the distributor bar means 24 and adjacent the side opposite the aperture means 26 so as to avoid direct exposure to the chemical effluent. The turbulent action of the mixture causes particles to strike the face of the plate 42 and touch the thermocouple junction tip 44 to give accurate readings and break up thin films of incrustation that may have started to form on the plate.

Polytetrafluoroethylene resin plastic reinforced with wire mesh is strong and tough as well as incrustation resistant, and this temperature sensing assembly will function properly for long periods of time without servicing.

By sealing the end of the flexible tube 34, the lead wires 46 and 48 are protected from the reacting mass of material 13. The weighted plug 36 rides against the drum wall and transmits vibrations to the tube 34 whereby to help prevent incrustation. The plug also serves to minimize whipping actions in the tube and to stabilize the thermocouple's position in the turbulent mixture.

A second embodiment of the present invention is shown in Fig. 4. The drum, axial tubes, distributor bar and feeder tubes are identical to those just described. A flexible tube 54 of the same construction as flexible tube 34 extends radially into the reacting mass of material 13 in like manner to tube 34 shown in Fig. 2. However, the thermocouple junction is not mounted on the side of the flexible tube. Rather, a metal tube 56 extends telescopically from within the flexible tube 54. The metal tube 56 terminates in a sealed end 58. On the downward side of the metal tube a thermocouple junction 60 similar to junction 38 is provided. A cover plate 62 and protruding wires 64 are also provided. Lead wires 66 and 68 extend from the thermocouple junction through the various tubes to a pyrometer or other electric meter means for measuring temperatures sensed by the thermocouple junction.

Many details of construction may be varied without departing from the principles of this invention, and it is not intended to limit the patent granted on this invention otherwise than necessitated by the scope of the appended claims. For example, the temperature sensing apparatus of the present invention may be used in pug mills or other agitators as well as in the specific rotary drum units shown. In interpreting the scope of the appended claims, pug mills, free fall mixers, reactors with rotating agitators including feed screws, rotating shafts, etc., and all other operable reactor mixers are to be considered as falling within the scope of the definition of "rotary drum reactor."

The invention is claimed as follows:

1. For sensing temperatures in a moving bed of semi-fluid consistency, the combination comprising: a flexible tube disposed right angularly to the direction of movement of said bed and having one end immersed in said bed; a weighting member secured to said end to dislocate the center of gravity of said tube to a position adjacent said end; thermocouple means mounted on said tube to be exposed to said bed; and electrical conductor means extending through at least a portion of said tube to connect said thermocouple means externally.

2. For sensing temperatures in a moving bed of semi-fluid consistency, the combination comprising: a flexible tube disposed right angularly to the direction of movement of said bed and having one end immersed in said bed; a weighting member, including a solid plug secured to and sealing off said end dislocating the center of gravity of said tube to a position adjacent said end; thermocouple means mounted on said tube to be exposed to said bed; and electrical conductor means extending through at least a portion of said tube to connect said thermocouple means externally.

3. For sensing temperatures in a moving bed of semi-fluid consistency, the combination comprising: a flexible tube disposed right angularly to the direction of movement of said bed and having one end immersed in said bed; a weighting member, including a solid plug secured to and sealing off said end dislocating the center of gravity of said tube to a position adjacent said end; thermocouple means mounted in the wall of said tube away from said end to be exposed to said bed; and electrical conductor means extending through at least a portion of said tube to connect said thermocouple means externally.

4. For sensing temperatures in a moving bed of semi-fluid consistency, the combination comprising: a hollow flexible tube having an axial bore, said tube being disposed right angularly to the direction of movement of said bed and having one end immersed in said bed; a weighting member, including a rigid tube coaxially extending from and telescopically received in said end of said bore to dislocate the center of gravity of said flexible tube to a position adjacent said end; thermocouple means mounted on a sidewall of one of said tubes spaced from said end to be exposed to said bed; and electrical conductor means extending through at least a portion of said tubes to connect said thermocouple means externally.

5. For sensing temperatures in a moving bed of semi-fluid consistency, the combination comprising: a hollow flexible tube having an axial bore, said tube being disposed right angularly to the direction of movement of said bed and having one end immersed in said bed; a weighting member, including a rigid tube coaxially extending from and telescopically received in said end of said bore to dislocate the center of gravity of said flexible tube to a position adjacent said end; thermocouple means mounted on a sidewall of said rigid tube spaced from said end to be exposed to said bed; and electrical conductor means extending through at least a portion of said tubes to connect said thermocouple means externally.

6. For sensing temperatures in a moving bed of semi-fluid consistency, the combination comprising: a flexible tube having a smooth exterior surface, said flexible tube being disposed right angularly to the direction of movement of said bed, being arranged to be relocatable along an axis of said bed, and having one end immersed in said bed; a weighting member secured to said end to dislocate the center of gravity of said tube to a position adjacent said end; thermocouple means mounted on said tube to be exposed to said bed; and electrical conductor means extending through at least a portion of said tube to connect said thermocouple means externally.

7. A rotary drum reactor comprising a horizontally mounted drum partially filled with a fluid mixture, said drum being rotatable about its axis, stationary distributor means disposed within said drum through which chemicals are added to said mixture, and a stationary temperature sensing apparatus disposed adjacent to said distributor means, said apparatus comprising a flexible tube sealed and weighted at its outer end portion, thermocouple means mounted on a side wall of said flexible tube and exposed to said mixture, electric connection means extending through said flexible tube and external electric means connected by said connection means to said thermocouple whereby temperatures within said mixture can be measured.

8. A rotary drum reactor comprising a horizontally mounted drum partially filled with a fluid mixture, said drum being rotatable about its axis, a stationary distributor bar disposed within said drum through which chemicals can be added to said mixture, axial feeder tube means extending axially within said drum, radial feeder tube means joined to said axial feeder tube means and extending radially downward therefrom at an angle of approximately 45° from vertical in the direction of rotation of said drum, said distributor bar being joined to said radial feeder tube means and being disposed longitudinally within said drum, said distributor bar being provided with aperture means in its upstream side for emission of said chemicals, an axially movable temperature sensing apparatus comprising rigid axial tube means extending axially within said drum, flexible radial tube means joined to said rigid axial tube means and extending radially outward therefrom, thermocouple means mounted on the counterclockwise side of said flexible tube means and exposed to said mixture, electric connection means extending through said flexible and rigid tube means, and external electric means connected by said connection means to said thermocouple whereby temperatures within said mixture can be ascertained, said thermocouple means being disposed adjacent and downstream of said distributor bar, said flexible tube being sealed and weighted at its radially outward end whereby said end frictionally engages the inner wall of said drum as said drum rotates.

9. A rotary drum reactor as set forth in claim 8 wherein said flexible tube is of polytetrafluoroethylene plastic construction whereby to prevent excessive material build up on said flexible tube.

10. A rotary drum reactor as set forth in claim 8 wherein said flexible tube is of rubber construction.

References Cited in the file of this patent

UNITED STATES PATENTS

| | | |
|---|---|---|
| 2,316,208 | Woodruff | Apr. 13, 1943 |
| 2,640,357 | Stephenson | June 2, 1953 |
| 2,826,625 | MacDonald | Mar. 11, 1958 |
| 2,854,211 | Jackson | Sept. 30, 1958 |